US011290722B2

(12) United States Patent
Zhao et al.

(10) Patent No.: US 11,290,722 B2
(45) Date of Patent: Mar. 29, 2022

(54) METHOD AND APPARATUS FOR VIDEO ENCODING OR DECODING

(71) Applicant: TENCENT AMERICA LLC, Palo Alto, CA (US)

(72) Inventors: Xin Zhao, San Diego, CA (US); Xiaozhong Xu, State College, PA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/815,729

(22) Filed: Mar. 11, 2020

(65) Prior Publication Data
US 2020/0296382 A1 Sep. 17, 2020

Related U.S. Application Data

(60) Provisional application No. 62/817,517, filed on Mar. 12, 2019.

(51) Int. Cl.
| | | |
|---|---|---|
| *H04N 19/137* | (2014.01) | |
| *H04N 19/119* | (2014.01) | |
| *H04N 19/80* | (2014.01) | |
| *H04N 19/176* | (2014.01) | |
| *H04N 19/159* | (2014.01) | |
| *H04N 19/186* | (2014.01) | |
| *H04N 19/96* | (2014.01) | |

(52) U.S. Cl.
CPC ......... *H04N 19/137* (2014.11); *H04N 19/119* (2014.11); *H04N 19/159* (2014.11);
(Continued)

(58) Field of Classification Search
CPC .... H04N 19/137; H04N 19/119; H04N 19/80; H04N 19/176; H04N 19/159;
(Continued)

(56) References Cited

U.S. PATENT DOCUMENTS

| 2015/0030067 A1* | 1/2015 | Zhao | .................... H04N 19/176 375/240.02 |
|---|---|---|---|
| 2017/0094288 A1 | 3/2017 | Hannuksela | |

(Continued)

OTHER PUBLICATIONS

Tamse and Park (Joint Video Experts Team (JVET) of ITU-T SG 16 WP 3 and ISO/IEC JTC 1/SC 29/WG 11 13th Meeting: Marrakech, MA, Jan. 9-18, 2019 "CE2-related: MV Derivation for Affine Chroma" (Year: 2019).*

(Continued)

*Primary Examiner* — Richard A Hansell, Jr.
(74) *Attorney, Agent, or Firm* — Sughrue Mion, PLLC

(57) ABSTRACT

A method and apparatus for encoding or decoding a video sequence includes encoding or decoding the video sequence using a 4:4:4 chroma format, or encoding or decoding the video sequence using a 4:2:2 chroma format, wherein when encoding or decoding the video sequence using the 4:4:4 chroma format, copying an affine motion vector of one 4×4 luma block using an operation other than an averaging operation and associating the affine motion vector to a co-located 4×4 chroma block, and when encoding or decoding the video sequence using the 4:2:2 chroma format, associating each 4×4 chroma block with two 4×4 co-located luma blocks such that an affine motion vector of one 4×4 chroma block is an average of the motion vectors of the two co-located luma blocks.

16 Claims, 21 Drawing Sheets

(52) U.S. Cl.
CPC ......... *H04N 19/176* (2014.11); *H04N 19/186* (2014.11); *H04N 19/80* (2014.11); *H04N 19/96* (2014.11)

(58) Field of Classification Search
CPC ...... H04N 19/186; H04N 19/96; H04N 19/54; H04N 19/513
See application file for complete search history.

(56) References Cited

U.S. PATENT DOCUMENTS

| | | | |
|---|---|---|---|
| 2018/0270500 A1 | 9/2018 | Li et al. | |
| 2018/0332284 A1* | 11/2018 | Liu | H04N 19/139 |
| 2019/0068969 A1 | 2/2019 | Rusanovskyy et al. | |
| 2019/0068989 A1 | 2/2019 | Lee | |
| 2019/0166382 A1* | 5/2019 | He | H04N 19/186 |
| 2020/0059659 A1* | 2/2020 | Chen | H04N 19/56 |
| 2020/0275118 A1* | 8/2020 | Wang | H04N 19/139 |
| 2021/0203947 A1* | 7/2021 | He | H04N 19/134 |

OTHER PUBLICATIONS

Tamse and Park (Joint Video Experts Team (JVET) of ITU-T SG 16 WP 3 and ISO/IEC JTC 1/SC 29/WG 11 13th Meeting: Marrakech, MA, Jan. 9-18, 2019 (Year: 2019).*
Written Opinion and International Search Report dated Jun. 15, 2020, from the International Searching Authority in International Application No. PCT/US2020/22066.

* cited by examiner

METHOD AND APPARATUS FOR VIDEO ENCODING OR DECODING

CROSS-REFERENCE TO RELATED APPLICATION

This application claims priority under 35 U.S.C. § 119 from U.S. Provisional Application No. 62/817,517 filed on Mar. 12, 2019 in the U.S. Patent & Trademark Office, the disclosure of which is incorporated herein by reference in its entirety.

FIELD

Methods and apparatuses consistent with embodiments relate to video processing, and more particularly, encoding or decoding a video sequence which can support different chroma formats (e.g. 4:4:4, 4:2:2) in Versatile Video Coding (VVC).

BACKGROUND

Recently, the Video Coding Experts Group (VCEG) of the ITU Telecommunication Standardization Sector (ITU-T), a sector of the International Telecommunication Union (ITU), and the ISO/IEC MPEG (JTC 1/SC 29/WG 11), a standardization subcommittee of the Joint Technical Committee ISO/IEC JTC 1 of the International Organization for Standardization (ISO) and the International Electrotechnical Commission (IEC), published the H.265/High Efficiency Video Coding (HEVC) standard in 2013 (version 1). This standard was updated in 2014 to version 2, in 2015 to version 3, and in 2016 to version 4.

Since then they have been studying the potential need for standardization of future video coding technologies with a compression capability that significantly exceeds that of the HEVC standard (including its extensions). In October 2017, they issued the Joint Call for Proposals on Video Compression with Capability beyond HEVC (CfP). By Feb. 15, 2018, a total of 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team-Joint Video Expert Team) meeting. With careful evaluation, JVET formally launched the standardization of next-generation video coding beyond HEVC, i.e., the so-called Versatile Video Coding (VVC).

An HEVC block partitioning structure will now be described. In HEVC, a coding tree unit (CTU) may be split into coding units (CUs) by using a quadtree structure denoted as a coding tree to adapt to various local characteristics. The decision on whether to code a picture area using inter-picture (temporal) or intra-picture (spatial) prediction may be made at the CU level. Each CU can be further split into one, two or four prediction units (PUs) according to the PU splitting type. Inside one PU, the same prediction process may be applied and the relevant information may be transmitted to a decoder on a PU basis. After obtaining the residual block by applying the prediction process based on the PU splitting type, a CU can be partitioned into transform units (TUs) according to another quadtree structure like the coding tree for the CU. A feature of the HEVC structure is that it may contain multiple partition concepts including CU, PU, and TU. In HEVC, a CU or a TU can generally only be square shape, while a PU may be a square or rectangular shape for an inter predicted block. In HEVC, one coding block may be further split into four square sub-blocks, and a transform may be performed on each sub-block, i.e., TU. Each TU can be further split recursively (using a quadtree split) into smaller Tus. This is referred to as a Residual Quad-Tree (RQT).

At a picture boundary, HEVC employs an implicit quad-tree split so that a block will keep quad-tree splitting until the size fits the picture boundary.

A block partitioning structure using a quad-tree (QT) plus binary tree (BT) will now be described. In HEVC, a CTU may be split into CUs by using a quadtree structure denoted as a coding tree to adapt to various local characteristics. The decision on whether to code a picture area using an inter-picture (temporal) or an intra-picture (spatial) prediction may be made at the CU level. Each CU can be further split into one, two, or four PUs according to the PU splitting type. Inside one PU, the same prediction process may be applied and the relevant information may be transmitted to the decoder on a PU basis. After obtaining the residual block by applying the prediction process based on the PU splitting type, a CU can be partitioned into transform units (TUs) according to another quadtree structure like the coding tree for the CU. One feature of the HEVC structure is that it includes multiple partition concepts including CU, PU, and TU.

The QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 1A, a coding tree unit (CTU) is first partitioned by a quadtree structure. The quadtree leaf nodes may be then further partitioned by a binary tree structure. There may be two splitting types, symmetric horizontal splitting and symmetric vertical splitting, in the binary tree splitting. The binary tree leaf nodes are called coding units (CUs), and that segmentation may be used for prediction and transform processing without any further partitioning. This means that the CU, PU and TU have the same block size in the QTBT coding block structure. In the JEM, a CU may sometimes consist of coding blocks (CBs) of different color components, e.g. one CU may contain one luma CB and two chroma CBs in the case of P and B slices of the 4:2:0 chroma format; and may contain a CB of a single component, e.g., one CU may contain only one luma CB or just two chroma CBs in the case of I slices.

The following parameters are defined for the QTBT partitioning scheme:

CTU size: the root node size of a quadtree, the same concept as in HEVC;

MinQTSize: the minimum allowed quadtree leaf node size;

MaxBTSize: the maximum allowed binary tree root node size;

MaxBTDepth: the maximum allowed binary tree depth;

MinBTSize: the minimum allowed binary tree leaf node size;

In one example of a QTBT partitioning structure, the CTU size may be set as 128×128 luma samples with two corresponding 64×64 blocks of chroma samples, the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node may be also the root node for the binary tree and it may have a binary tree depth as 0. When the binary tree depth reaches MaxBTDepth (i.e., 4), no further splitting is considered. When the binary tree node has a width equal to MinBTSize (i.e., 4), no further horizontal splitting is considered. Similarly, when the binary tree node has a height equal to the MinBTSize, no further vertical splitting is considered. The leaf nodes of the binary tree may be further processed by prediction and transform processing without any further partitioning. In the JEM, the maximum CTU size may be 256×256 luma samples.

FIG. 1A illustrates an example of block partitioning by using a QTBT, and FIG. 1B illustrates the corresponding tree representation. The solid lines indicate quadtree splitting and the dotted lines indicate binary tree splitting. In each splitting (i.e., non-leaf) node of the binary tree, one flag may be signaled to indicate which splitting type (i.e., horizontal or vertical) may be used, where 0 indicates horizontal splitting and 1 indicates vertical splitting. For the quadtree splitting, there is no need to indicate the splitting type since quadtree splitting splits a block both horizontally and vertically to produce 4 sub-blocks with an equal size.

In addition, the QTBT scheme supports the flexibility for the luma and chroma to have a separate QTBT structure. Currently, for P and B slices, the luma and chroma CTBs in one CTU share the same QTBT structure. However, for I slices, the luma CTB may be partitioned into CUs by a QTBT structure, and the chroma CTBs may be partitioned into chroma CUs by another QTBT structure, namely a DualTree (DT) structure. This means that a CU in an I slice consists of a coding block of the luma component or coding blocks of two chroma components, and a CU in a P or B slice consists of coding blocks of all three color components.

In HEVC, inter prediction for small blocks may be restricted to reduce the memory access of motion compensation, such that bi-prediction is not supported for 4×8 and 8×4 blocks, and inter prediction is not supported for 4×4 blocks. In the QTBT scheme as implemented in the JEM-7.0, these restrictions may be removed.

Block partitioning using ternary trees (TTs) will now be described. A Multi-type-tree (MTT) structure has been proposed. MTT is a more flexible tree structure than QTBT. In MTT, other than quad-trees and binary-trees, horizontal and vertical center-side triple-trees are introduced, as shown in FIGS. 2A and 2B.

Some benefits of the triple-tree partitioning include:
providing a complement to quad-tree and binary-tree partitioning triple-tree partitioning is able to capture objects located in a block center while quad-tree and binary-tree may be split along the block center;
the width and height of the partitions of the triple trees may be a power of 2 so that no additional transforms are needed;
the design of two-level trees is mainly motivated by complexity reduction; theoretically, the complexity of traversing of a tree is TAD, where T denotes the number of split types, and D is the depth of tree.

YUV formats will now be described. Different YUV formats, i.e., chroma formats, are shown in FIG. 3. Different chroma formats define different down-sampling grids of different color components.

Cross-component linear modeling (CCLM) will now be described. In VTM, for the chroma component of an intra PU, the encoder selects the best chroma prediction modes among 8 modes including Planar, DC, Horizontal, Vertical, a direct copy of the intra prediction mode (DM) from the luma component, Left and Top Cross-component Linear Mode (LT_CCLM), Left Cross-component Linear Mode (L_CCLM), and Top Cross-component Linear Mode (T_CCLM). Of these modes, LT_CCLM, L_CCLM, and T_CCLM can be categorized as a Cross-component Linear Mode (CCLM). A difference between these 3 modes is that different regions of neighboring samples may be used for deriving the parameters $\alpha$ and $\beta$. For LT_CCLM, both the left and top neighboring samples may be used to derive the parameters $\alpha$ and $\beta$ For L_CCLM, only the left neighboring samples are used to derive the parameters $\alpha$ and $\beta$. For T_CCLM, only the top neighboring samples are used to derive the parameters $\alpha$ and $\beta$.

Cross-Component Linear Model (CCLM) prediction modes may be used to reduce the cross-component redundancy, in which the chroma samples may be predicted based on the reconstructed luma samples of the same CU by using a linear model as follows:

$$\text{pred}_c(i,j) = \alpha \cdot \text{rec}_L'(i,j) + \beta. \tag{Eq. 1}$$

Here, $\text{pred}_c(i,j)$ represents the predicted chroma samples in a CU and $\text{rec}_L'(i,j)$ represents the downsampled reconstructed luma samples of the same CU. Parameters $\alpha$ and $\beta$ may be derived by a straight line equation, e.g., a max-min method. This computation process may be performed as part of the decoding process, not just as an encoder search operation, so no syntax is used to convey the $\alpha$ and $\beta$ values.

For chroma 4:2:0 format, CCLM prediction applies a six-tap interpolation filter to obtain the down-sampled luma sample corresponding to a chroma sample as shown in FIG. 3. Here, a down-sampled luma sample Rec'L[x, y] may be calculated from reconstructed luma samples.

The down-sampled luma samples may be used to find the maximum and minimum sample points. The two points (couple of Luma and Chroma) (A, B) may be the minimum and maximum values inside the set of neighboring Luma samples as depicted in FIG. 4. Where the linear model parameters $\alpha$ and $\beta$ may be obtained according to the following equation:

$$\alpha = \frac{y_B - y_A}{x_B - x_A} \tag{Eq. 2}$$

$$\beta = y_A - \alpha x_A \tag{Eq. 3}$$

Here, division may be avoided and replaced by a multiplication and a shift. A Look-up Table (LUT) may be used to store the pre-calculated values, and the absolute difference values between maximum and minimum luma samples may be used to specify the entry index of the LUT, and the size of the LUT may be 512.

In a T_CCLM mode, only the neighboring samples (including 2*W samples) shown in FIGS. 5A and 5B may be used to calculate the linear model coefficients.

In a L_CCLM mode, only left neighboring samples (including 2*H samples) may be used to calculate the linear model coefficients, as shown in FIGS. 6A and 6B.

The CCLM prediction mode also includes prediction between the two chroma components, i.e., the Cr component may be predicted from the Cb component. Instead of using the reconstructed sample signal, the CCLM Cb-to-Cr prediction may be applied in a residual domain. This may be implemented by adding a weighted reconstructed Cb residual to the original Cr intra prediction to form the final Cr prediction:

$$pred_{cr}^{*}(i,j) = pred_{cr}(i,j) + \alpha \cdot resi_{cb}'(i,j). \quad \text{(Eq. 4)}$$

The CCLM luma-to-chroma prediction mode may be added as one additional chroma intra prediction mode. At the encoder side, one more RD cost check for the chroma components may be added for selecting the chroma intra prediction mode. When cb intra prediction modes other than the CCLM luma-to-chroma prediction mode may be used for the chroma components of a CU, CCLM Cb-to-Cr prediction may be used for Cr component prediction.

Multiple Model CCLM (MMLM) is another extension of CCLM. As indicated by the name, there can be more than one model in MMLM, e.g., two models may be used. In MMLM, neighboring luma samples and neighboring chroma samples of the current block may be classified into two groups, each group may be used as a training set to derive a linear model (i.e., a particular $\alpha$ and $\beta$ may be derived for a particular group). Furthermore, the samples of the current luma block may be also classified based on the same rule for the classification of neighboring luma samples.

FIG. 8 shows an example of classifying the neighboring samples into two groups. The threshold may be calculated as the average value of the neighboring reconstructed luma samples. A neighboring sample with Rec'L[x,y]<=Threshold may be classified into group 1; while a neighboring sample with Rec'L[x,y]>Threshold may be classified into group 2:

$$\begin{cases} Pred_C[x,y] = \alpha_1 \times Rec_L'[x,y] + \beta_1 & \text{if } Rec_L'[x,y] \le \text{Threshold} \\ Pred_C[x,y] = \alpha_2 \times Rec_L'[x,y] + \beta_2 & \text{if } Rec_L'[x,y] > \text{Threshold} \end{cases} \quad \text{(Eq. 5)}$$

An affine motion compensated prediction will now be described. In HEVC, a translation motion model may be applied for motion compensation prediction (MCP). However, there may be many kinds of motion, e.g. zoom in/out, rotation, perspective motions and other irregular motions. In the VTM4, a block-based affine transform motion compensation prediction may be applied. As shown FIG. 9, the affine motion field of the block may be described by motion information of two control point motion vectors (4-parameter) or three control point motion vectors (6-parameter).

For a 4-parameter affine motion model, motion vector at a sample location (x, y) in a block may be derived as:

$$\begin{cases} mv_x = \dfrac{mv_{1x} - mv_{0x}}{W} x + \dfrac{mv_{1y} - mv_{0y}}{W} y + mv_{0x} \\ mv_y = \dfrac{mv_{1y} - mv_{0y}}{W} x + \dfrac{mv_{1y} - mv_{0x}}{W} y + mv_{0y} \end{cases} \quad \text{(Eq. 6)}$$

For a 6-parameter affine motion model, motion vector at a sample location (x, y) in a block may be derived as:

$$\begin{cases} mv_x = \dfrac{mv_{1x} - mv_{0x}}{W} x + \dfrac{mv_{2x} - mv_{0x}}{H} y + mv_{0x} \\ mv_y = \dfrac{mv_{1y} - mv_{0y}}{W} x + \dfrac{mv_{2y} - mv_{0y}}{H} y + mv_{0y} \end{cases} \quad \text{(Eq. 7)}$$

Here, $mv_{0x}$, $mv_{0y}$ is a motion vector of the top-left corner control point, $mv_{1x}$, $mv_{1y}$ is a motion vector of the top-right corner control point, and $mv_{2x}$, $mv_{2y}$ is a motion vector of the bottom-left corner control point.

In order to simplify the motion compensation prediction, block based affine transform prediction may be applied. To derive motion vectors of each 4×4 luma sub-block, the motion vector of a center sample of each sub-block, as shown in FIG. 10, may be calculated according to above equations, and rounded to 1/16 fraction accuracy. Then the motion compensation interpolation filters may be applied to generate the prediction of each sub-block with a derived motion vector. The sub-block size of chroma-components may also be set to be 4×4. The MV of a 4×4 chroma sub-block may be calculated as the average of the MVs of the four corresponding 4×4 luma sub-blocks. As done for translational motion inter prediction, there may be also two affine motion inter prediction modes: affine merge mode and affine AMVP mode.

An affine merge prediction will now be described. AF_MERGE mode may be applied for CUs with both a width and a height larger than or equal to 8. In this mode the CPMVs of the current CU may be generated based on the motion information of the spatial neighboring CUs. There may be up to five CPMVP candidates and an index may be signaled to indicate the one to be used for the current CU. The following three types of CPVM candidate may be used to form the affine merge candidate list:

(1) inherited affine merge candidates extrapolated from the CPMVs of the neighbor CUs;

(2) constructed affine merge candidates CPMVPs that may be derived using the translational MVs of the neighbor CUs; and (3) Zero MVs.

In VTM4, there may be a of maximum two inherited affine candidates, which may be derived from an affine motion model of the neighboring blocks, one from left neighboring CUs and one from above neighboring CUs. The candidate blocks are shown in FIG. 11. For the left predictor, the scan order may be A0→A1, and for the above predictor, the scan order may be B0→B1→B2. The first inherited candidate from each side may be selected. No pruning check is required to be performed between two inherited candidates. When a neighboring affine CU is identified, its control point motion vectors may be used to derive the CPMVP candidate in the affine merge list of the current CU. As shown in FIG. 12, if the neighbor left bottom block A is coded in affine mode, the motion vectors $v_2$, $v_3$ and $v_4$ of the top left corner, above right corner and left bottom corner of the CU which contains the block A may be attained. When block A is coded with a 4-parameter affine model, the two CPMVs of the current CU may be calculated according to $v_2$, and $v_3$. In case that block A may be coded with a 6-parameter affine model, the three CPMVs of the current CU may be calculated according to $v_2$, $v_3$ and $v_4$.

Constructed affine candidate means the candidate may be constructed by combining the neighbor translational motion information of each control point. The motion information for the control points may be derived from the specified spatial neighbors and temporal neighbor shown in FIG. 13. CPMVk (k=1, 2, 3, 4) represents the k-th control point. For CPMV1, the B2→B3→A2 blocks may be checked and the MV of the first available block may be used. For CPMV2, the B1→B0 blocks may be checked and for CPMV3, the A1→A0 blocks may be checked. For TMVP is used as CPMV4 if it is available.

After MVs of four control points are attained, affine merge candidates may be constructed based on that motion information. The following combinations of control point MVs may be used to construct in order: {CPMV$_1$, CPMV$_2$, CPMV$_3$}, {CPMV$_1$, CPMV$_2$, CPMV$_4$}, {CPMV$_1$, CPMV$_3$, CPMV$_4$}, {CPMV$_2$, CPMV$_3$, CPMV$_4$}, {CPMV$_1$, CPMV$_2$}, and {CPMV$_1$, CPMV$_3$}.

The combination of 3 CPMVs constructs a 6-parameter affine merge candidate and the combination of 2 CPMVs constructs a 4-parameter affine merge candidate. To avoid a motion scaling process, if the reference indices of control points are different, the related combination of control point MVs may be discarded.

After inherited affine merge candidates and constructed affine merge candidates may be checked, if the list is still not full, zero MVs may be inserted to the end of the list.

An affine AMVP prediction will now be described. Affine AMVP mode can be applied for CUs with both a width and a height larger than or equal to 16. An affine flag in a CU level may be signaled in bitstream to indicate whether an affine AMVP mode may be to be used and another flag may be signaled to indicate whether a 4-parameter affine or a 6-parameter affine is to be used. In this mode, the difference of the CPMVs of current CU and their predictors CPMVPs may be signaled in bitstream. The affine AVMP candidate list size may be 2 and it may be generated by using the following four types of CPVM candidates in order:

(1) inherited affine AMVP candidates that may be extrapolated from the CPMVs of the neighbor CUs;
(2) constructed affine AMVP candidates CPMVPs that may be derived using the translational MVs of the neighbor CUs;
(3) translational MVs from neighboring CUs; and
(4) zero MVs The checking order of inherited affine AMVP candidates may be the same as the checking order of inherited affine merge candidates. A difference is that, for an AVMP candidate, an affine CU that has the same reference picture as in current block may be considered. No pruning process need be applied when inserting an inherited affine motion predictor into the candidate list.

A constructed AMVP candidate may be derived from the specified spatial neighbors shown in FIG. 13. The same checking order may be used as performed in an affine merge candidate construction. In addition, a reference picture index of a neighboring block may also checked. The first block in the checking order that may be inter coded and has the same reference picture as in current CUs may be used. When the current CU is coded with a 4-parameter affine mode, and mv$_0$ and mv$_1$ may be both available, they may be added as one candidate in the affine AMVP list. When the current CU is coded with a 6-parameter affine mode, and all three CPMVs are available, they may be added as one candidate in the affine AMVP list. Otherwise, a constructed AMVP candidate is set as unavailable.

If affine AMVP list candidates is still less than 2 after inherited affine AMVP candidates and constructed AMVP candidate are checked mv$_0$, mv$_1$, and mv$_2$ will be added, in order, as the translational MVs to predict all control point MVs of the current CU, when available. Finally, zero MVs may be used to fill the affine AMVP list if it is still not full.

An affine motion information storage will now be described. In VTM4, the CPMVs of affine CUs may be stored in a separate buffer. The stored CPMVs may be used to generate the inherited CPMVPs in an affine merge mode and an affine AMVP mode for the lately coded CUs. The sub-block MVs derived from CPMVs may be used for motion compensation, MV derivation of merge/AMVP list of translational MVs and de-blocking.

To avoid a picture line buffer for the additional CPMVs, affine motion data inheritance from the CUs from above CTU may be treated differently to the inheritance from the normal neighboring CUs. If the candidate CU for affine motion data inheritance is in the above CTU line, the bottom-left and bottom-right sub-block MVs in the line buffer instead of the CPMVs may be used for the affine MVP derivation. In this way, the CPMVs may be stored in local buffer. If the candidate CU is 6-parameter affine coded, the affine model may be degraded to 4-parameter model. As shown in FIG. 14, along the top CTU boundary, the bottom-left and bottom right sub-block motion vectors of a CU may be used for affine inheritance of the CUs in bottom CTUs.

Despite the above described advances, in VTM-4.0, the MV of a 4×4 chroma sub-block in an affine coded coding block is calculated as the average of the MVs of the four corresponding 4×4 luma sub-blocks. However, for chroma 4:4:4 and 4:2:2 formats, where each 4×4 chroma sub-block is associated with only one or two 4×4 luma sub-blocks, the current scheme of MV derivation for a 4×4 chroma component leaves room for improvement to accommodate the cases of chroma 4:4:4 and 4:2:2 formats.

SUMMARY

According to an aspect of the disclosure a method for encoding or decoding a video sequence may comprise: encoding or decoding the video sequence using a 4:4:4 chroma format, or encoding or decoding the video sequence using a 4:2:2 chroma format, wherein when encoding or decoding the video sequence using the 4:4:4 chroma format, the method may further comprises copying an affine motion vector of one 4×4 chroma block using an operation other than an averaging operation, and wherein when encoding or decoding the video sequence using the 4:2:2 chroma format, the method may further comprise associating each 4×4 chroma block with two 4×4 co-located chroma blocks such that an affine motion vector of one 4×4 chroma block is an average of the motion vectors of the two co-located chroma blocks.

According to an aspect of the disclosure, the method may further comprise, regardless of the chroma format, dividing a current 4×4 chroma block into four 2×2 sub-blocks, deriving a first affine motion vector of a co-located luma block for a top-left 2×2 chroma sub-block, deriving a second affine motion vector of the co-located luma block for a bottom-right 2×2 chroma block, and deriving an affine motion vector of the current 4×4 chroma block using the average of the first affine motion vector and the second affine motion vector.

According to an aspect of the disclosure, the method may comprise aligning an interpolation filter used for motion compensation between luma and chroma components.

According to this aspect of the disclosure, when a video sequence is input using a 4:2:0 chroma format, the method may further comprise applying an 8-tap interpolation filter for luma components and chroma components.

According to an aspect of the disclosure, the method may further comprise: coding as three separate trees, components Y, Cb, and Cr, and wherein each tree of the three separate trees, codes one component of the components Y, Cb, and Cr.

According to this aspect of the disclosure, the coding as three separate trees may be performed for an I slice or an I tile group.

According to an aspect of the disclosure, a maximum allowed transform size may be the same for different color components.

According to this aspect of the disclosure, when encoding or decoding the video sequence using the 4:2:2 chroma format, a maximum vertical size may be the same among different color components, and a maximum horizontal transform size for chroma components may be half of a maximum horizontal transform size for luma components.

According to an aspect of the disclosure, at least one of a Position-Dependent Predictor combination (PDPC), a Multiple Transform Selection (MTS), a Non-Separable Secondary Transform (NSST), an Intra-Sub Partitioning (ISP), and a Multiple reference line (MRL) intra prediction may be applied to both a luma component and a chroma component.

According to this aspect of the disclosure, when the Multiple reference line (MRL) intra prediction is applied to both the luma component and the chroma component, and when encoding or decoding the video sequence is performed using the 4:4:4 chroma format, the method may further comprise selecting an Nth reference for intra prediction, and using a same reference line without explicit signaling for chroma components; when the Intra-Sub Partitioning (ISP) is applied to both the luma component and the chroma component, the method may further comprise applying the Intra-Sub Partitioning (ISP) at a block level for a current block for components Y, Cb, and Cr; and when different trees are used for different color components, the method may further comprise implicitly deriving coding parameters for U and V components from collocated Y components without signaling.

According to an aspect of the disclosure, a device for encoding or decoding a video sequence, may comprise: at least one memory configured to store program code; at least one processor configured to read the program code and operate as instructed by the program code, the program code including: first encoding or decoding code configured to cause the at least one processor to encode or decode the video sequence using a 4:4:4 chroma format, or encode or decode the video sequence using a 4:2:2 chroma format, wherein when the first encoding or decoding code is configured to cause the at least one processor to encode or decode the video sequence using the 4:4:4 chroma format, the first encoding or decoding code may further comprise code configured to cause the at least one processor to copy an affine motion vector of one 4×4 chroma block using an operation other than an averaging operation, and wherein when the first encoding or decoding code is configured to cause the at least one processor to encode or decode the video sequence using the 4:2:2 chroma format, the first encoding or decoding code may further comprise code configured to cause the at least one processor to associate each 4×4 chroma block with two 4×4 co-located chroma blocks such that an affine motion vector of one 4×4 chroma block is an average of the motion vectors of the two co-located chroma blocks.

According to an aspect of the disclosure, the first encoding or decoding code may further comprise code configured to cause the at least one processor to: divide a current 4×4 chroma block into four 2×2 sub-blocks, derive a first affine motion vector of a co-located luma block for a top-left 2×2 chroma sub-block, derive a second affine motion vector of the co-located luma block for a bottom-right 2×2 chroma block, and derive an affine motion vector of the current 4×4 chroma block using the average of the first affine motion vector and the second affine motion vector.

According to an aspect of the disclosure, the first encoding or decoding code may further comprise code configured to cause the at least one processor to: align an interpolation filter used for motion compensation between luma and chroma components.

According to this aspect of the disclosure, when the first encoding or decoding code is configured to cause the at least one processor to encode or decode the video sequence using the 4:2:2 chroma format, the first encoding or decoding code may further comprise code configured to cause the at least one processor to apply an 8-tap interpolation filter for luma components and chroma components.

According to an aspect of the disclosure, the first encoding or decoding code may further comprise code configured to cause the at least one processor to: code as three separate trees, components Y, Cb, and Cr, and wherein each tree of the three separate trees codes one component of the components Y, Cb, and Cr.

According to this aspect of the disclosure, the configuration to code as three separate trees may be configured to be performed for an I slice or an I tile group.

According to an aspect of the disclosure, the first encoding or decoding code further may comprise code configured to cause the at least one processor to: allow a maximum transform size to be the same for different color components.

According to this aspect of the disclosure, when the first encoding or decoding code is configured to cause the at least one processor to encode or decode the video sequence using the 4:2:2 chroma format, the first encoding or decoding code may further comprise code configured to cause the at least one processor to set a maximum vertical size to be the same among different color components, and set a maximum horizontal transform size for chroma components to be half of a maximum horizontal transform size for luma components.

According to an aspect of the disclosure, the first encoding or decoding code may further comprise code configured to cause the at least one processor to: apply at least one of a Position-Dependent Predictor combination (PDPC), a Multiple Transform Selection (MTS), a Non-Separable Secondary Transform (NSST), an Intra-Sub Partitioning (ISP), and a Multiple reference line (MRL) intra prediction to both a luma component and a chroma component.

According to an aspect of the disclosure, a non-transitory computer-readable medium storing instructions may be provided, the instructions comprising: one or more instructions that, when executed by one or more processors of a device, cause the one or more processors to: encode or decode the video sequence using a 4:4:4 chroma format, or encode or decode the video sequence using a 4:2:2 chroma format, wherein when the instructions, when executed by the one or more processors of the device cause the one or more processors to encode or decode the video sequence using the 4:4:4 chroma format, the instructions, when executed by the one or more processors of the device, further cause the one or more processors to copy an affine motion vector of one 4×4 chroma block using an operation other than an averaging operation, and wherein when the instructions, when executed by the one or more processors of the device cause the one or more processors to encode or decode the video sequence using the 4:2:2 chroma format, the instructions, when executed by the one or more processors of the device, further cause the one or more processors to associate each 4×4 chroma block with two 4×4 co-located chroma blocks such that an affine motion vector of one 4×4 chroma block is an average of the motion vectors of the two co-located chroma blocks.

While the afore described methods, devices, and non-transitory computer-readable mediums have been described individually, these descriptions are not intended to suggest any limitation as to the scope of use or functionality thereof.

Indeed these methods, devices, and non-transitory computer-readable mediums may be combined in other aspects of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1A:
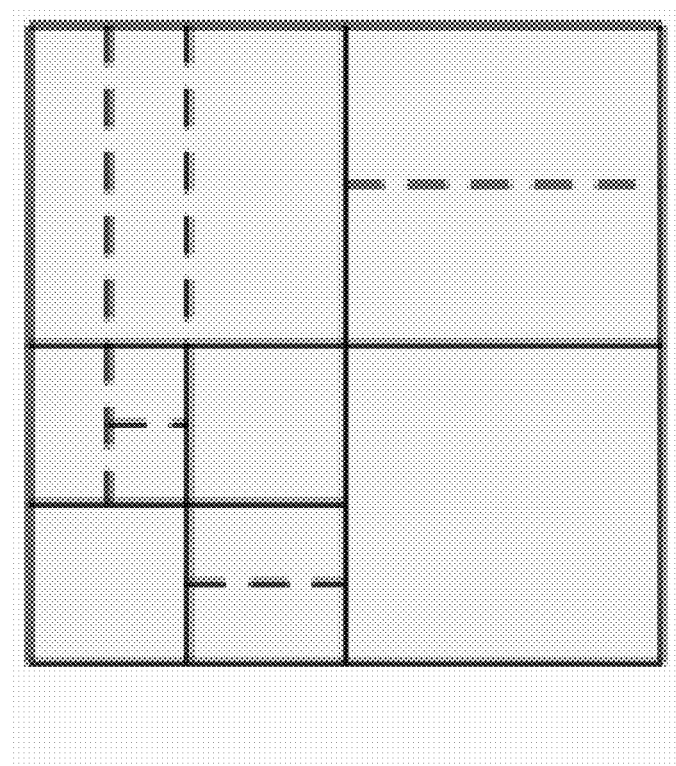
FIG. 1A is a diagram of a partitioned coding tree unit in accordance with an embodiment.
Figure 1B:
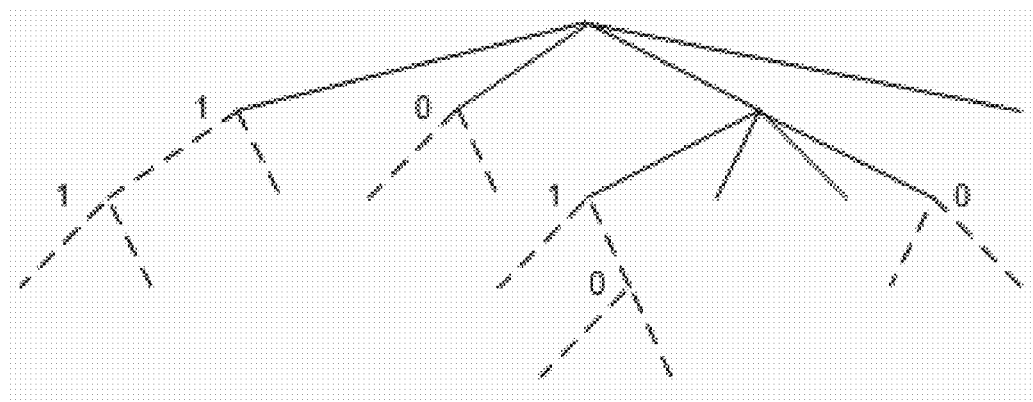
FIG. 1B is a diagram of a coding tree unit in accordance with an embodiment.
Figure 2A:
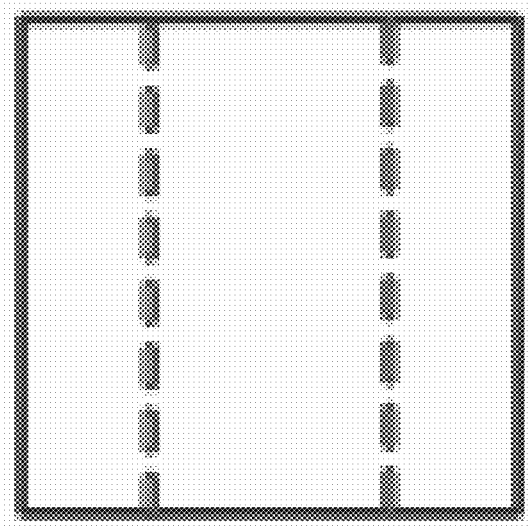
FIG. 2A is a diagram of a coding tree unit in accordance with an embodiment.
Figure 2B:
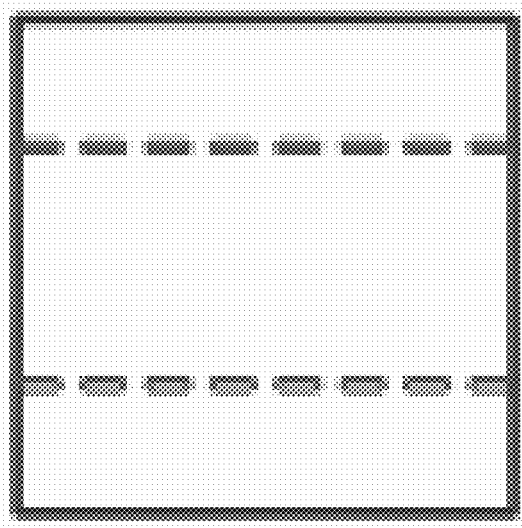
FIG. 2B is a diagram of a coding tree unit in accordance with an embodiment.
Figure 3:
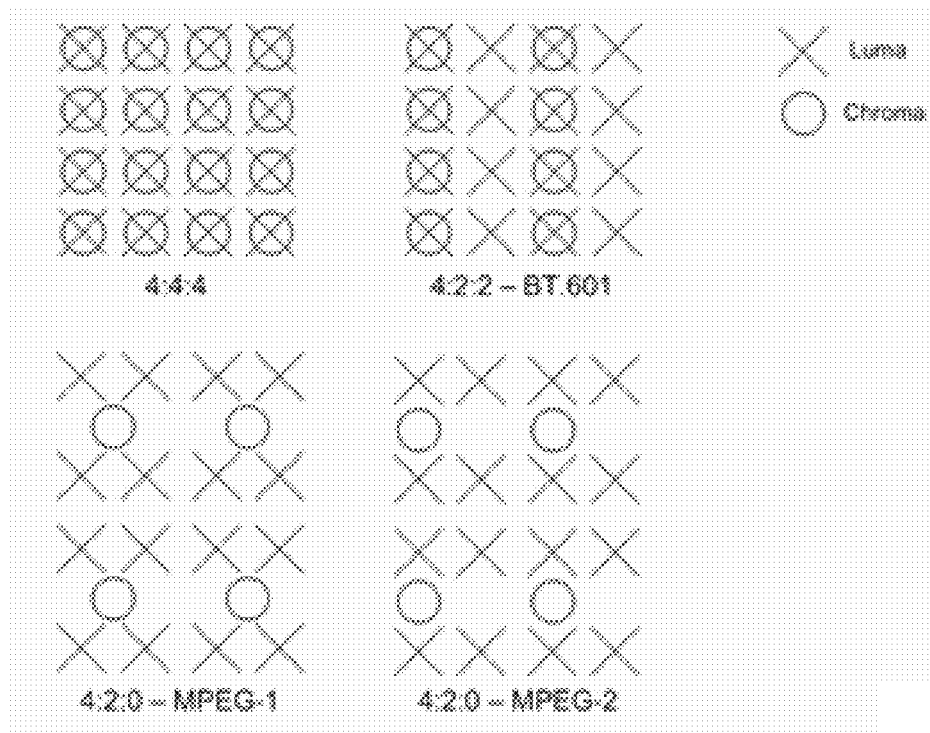
FIG. 3 is a diagram of different YUV formats in accordance with an embodiment.
Figure 4:
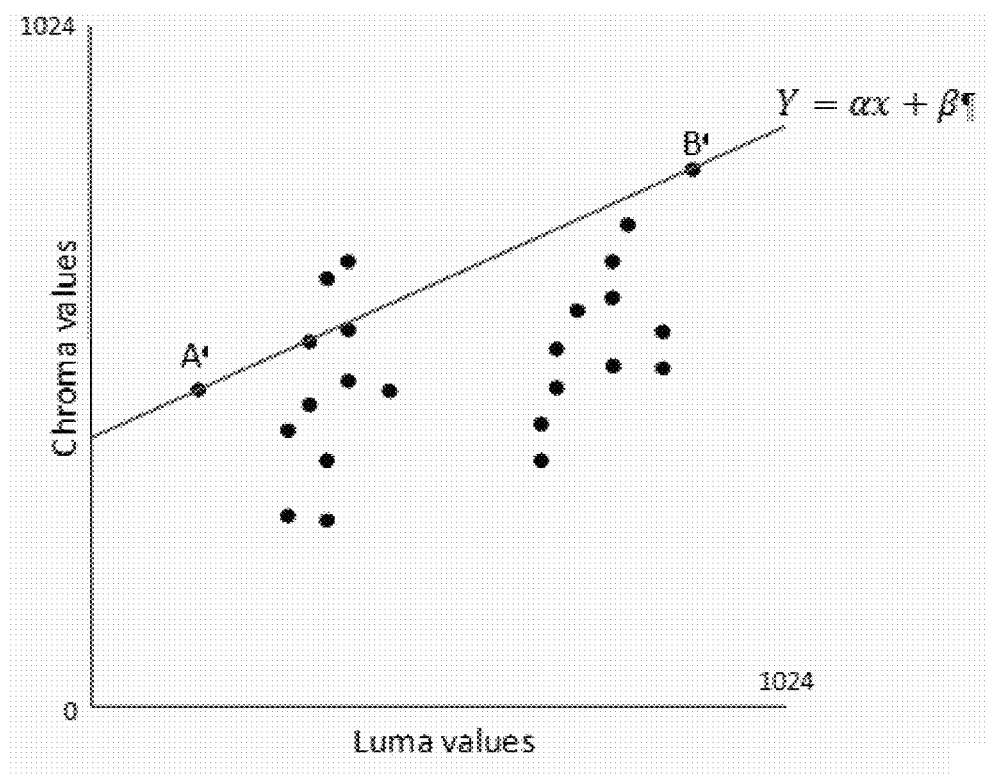
FIG. 4 is a diagram of different luma values in accordance with an embodiment.
Figures 5A, 5B:
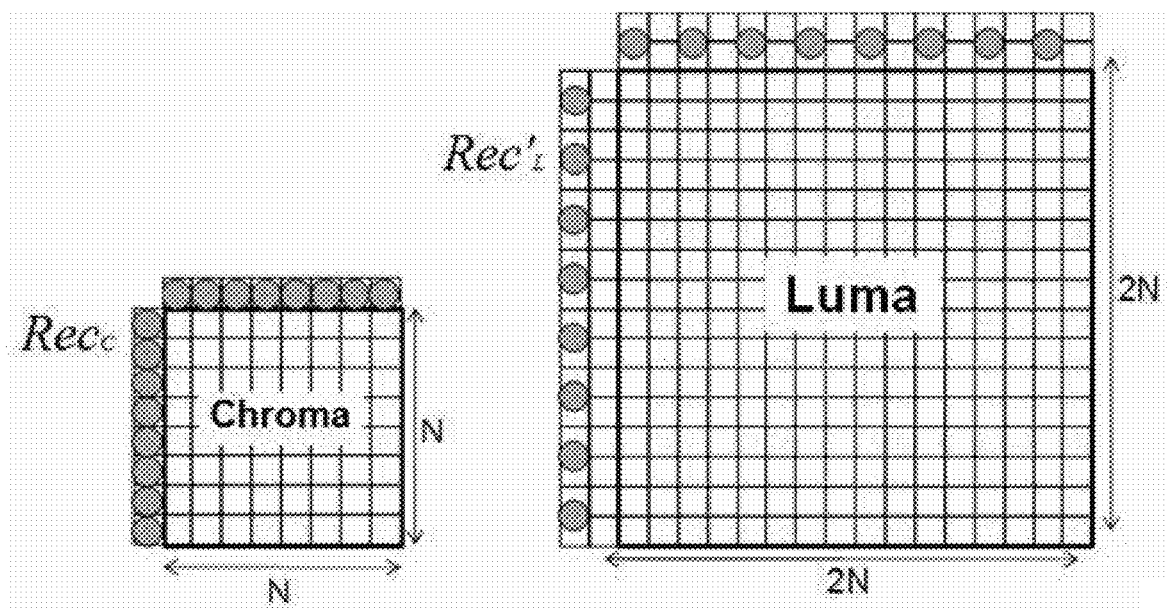
FIG. 5A is a diagram of samples used in cross-component linear modeling in accordance with an embodiment.
FIG. 5B is a diagram of samples used in cross-component linear modeling in accordance with an embodiment.
Figures 6A, 6B:
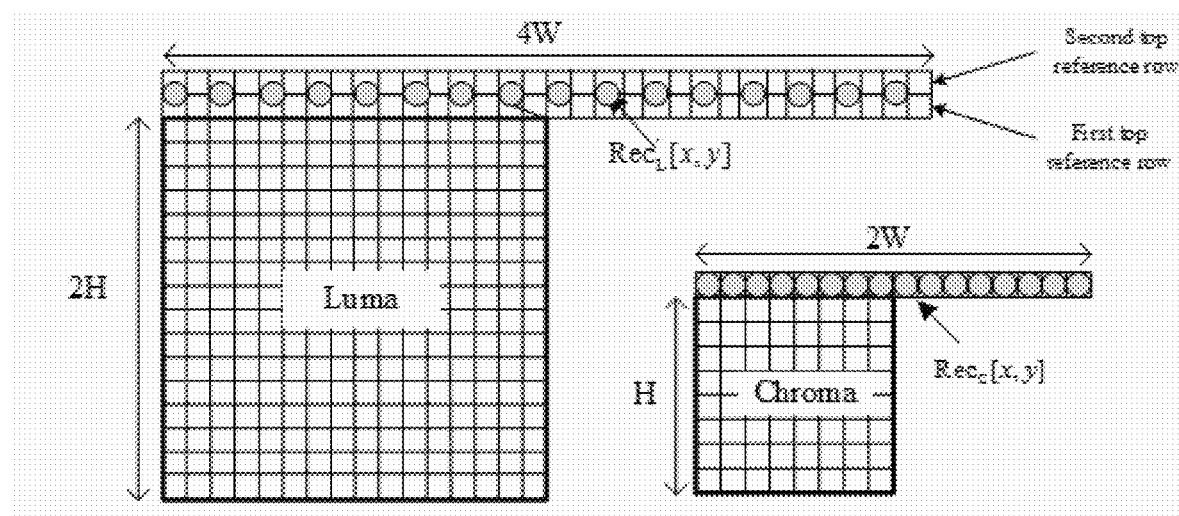
FIG. 6A is a diagram of samples used in cross-component linear modeling in accordance with an embodiment.
FIG. 6B is a diagram of samples used in cross-component linear modeling in accordance with an embodiment.
Figures 7A, 7B:
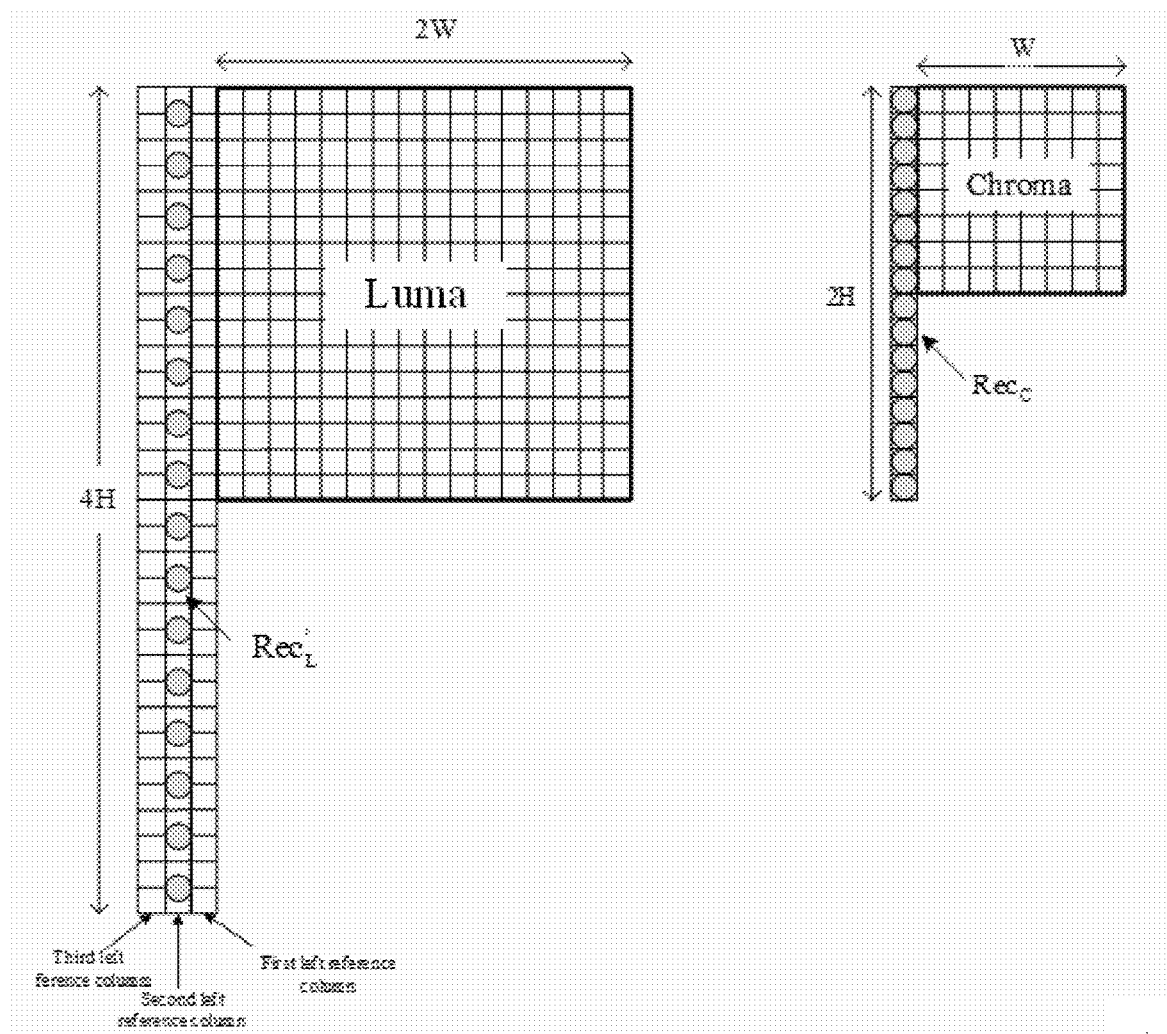
FIG. 7A is a diagram of samples used in cross-component linear modeling in accordance with an embodiment.
FIG. 7B is a diagram of samples used in cross-component linear modeling in accordance with an embodiment.
Figure 8:
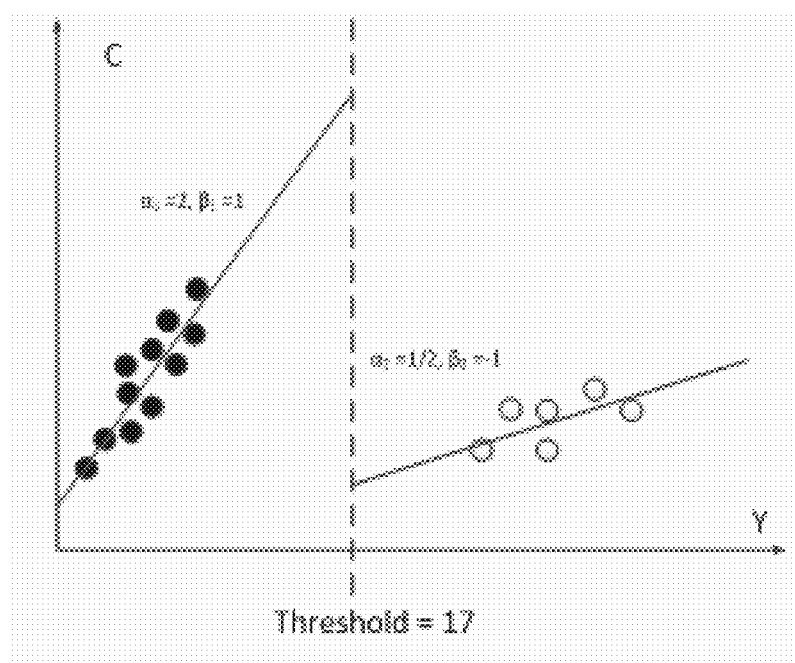
FIG. 8 is an example of a classification using a Multiple Model CCLM in accordance with an embodiment.
Figures 9A, 9B:
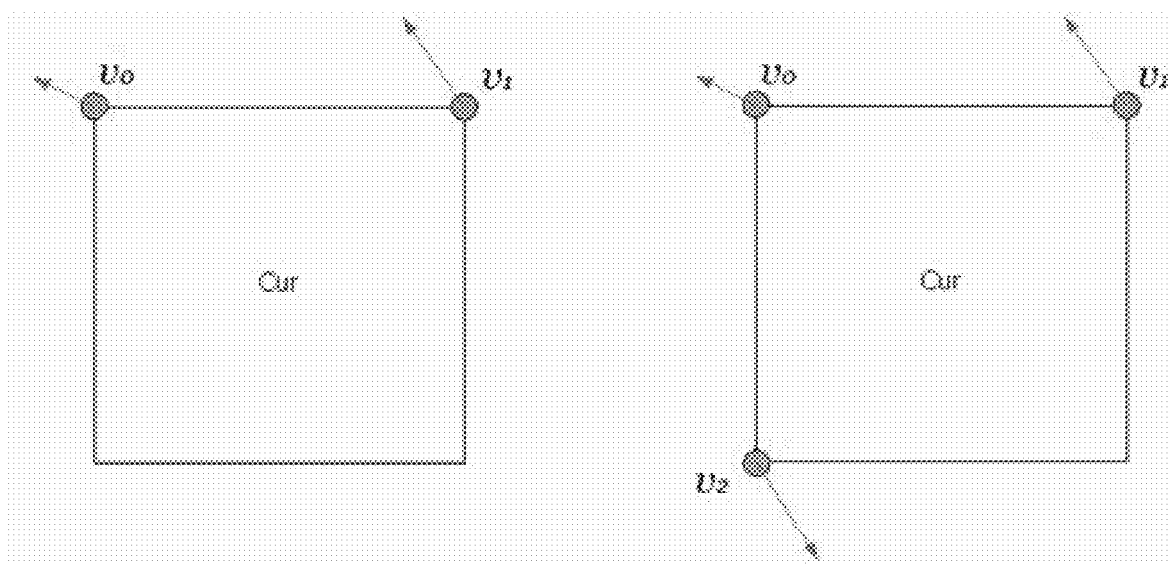
FIG. 9A is an example of an affine motion field of a block in accordance with an embodiment.
FIG. 9B is an example of an affine motion field of a block in accordance with an embodiment.
Figure 10:
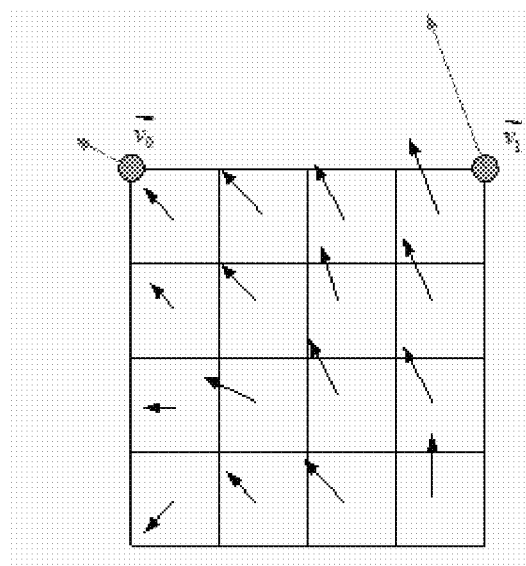
FIG. 10 is a an example of an affine motion vector field in accordance with an embodiment.
Figure 11:
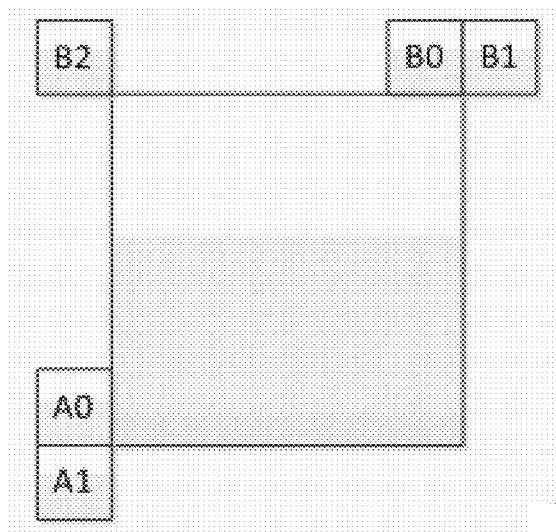
FIG. 11 is an example of candidate blocks for a prediction in accordance with an embodiment.
Figure 12:
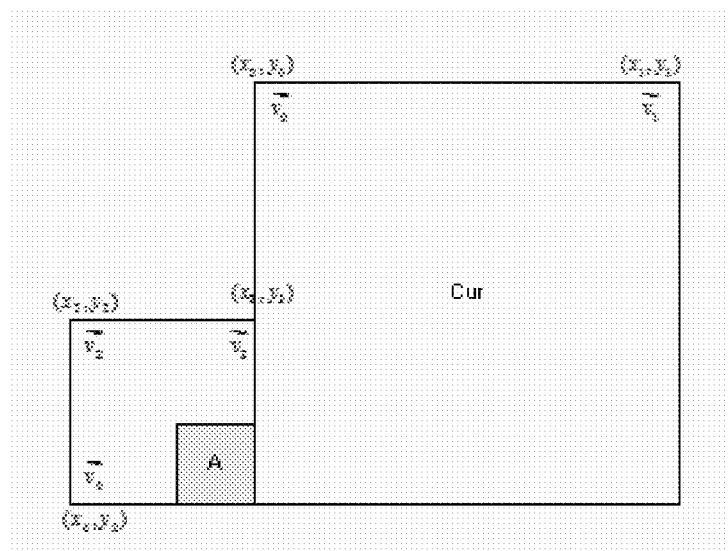
FIG. 12 is an example of candidate blocks for a prediction in accordance with an embodiment.
Figure 13:
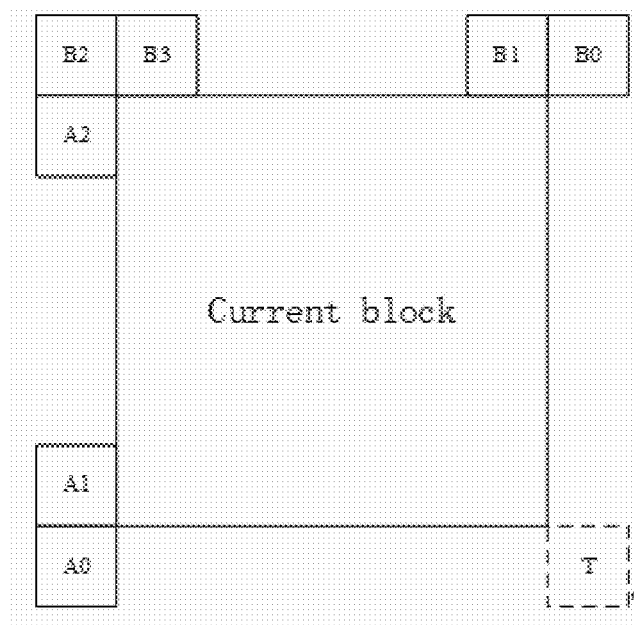
FIG. 13 is an example of candidate blocks for a prediction in accordance with an embodiment.
Figure 14:
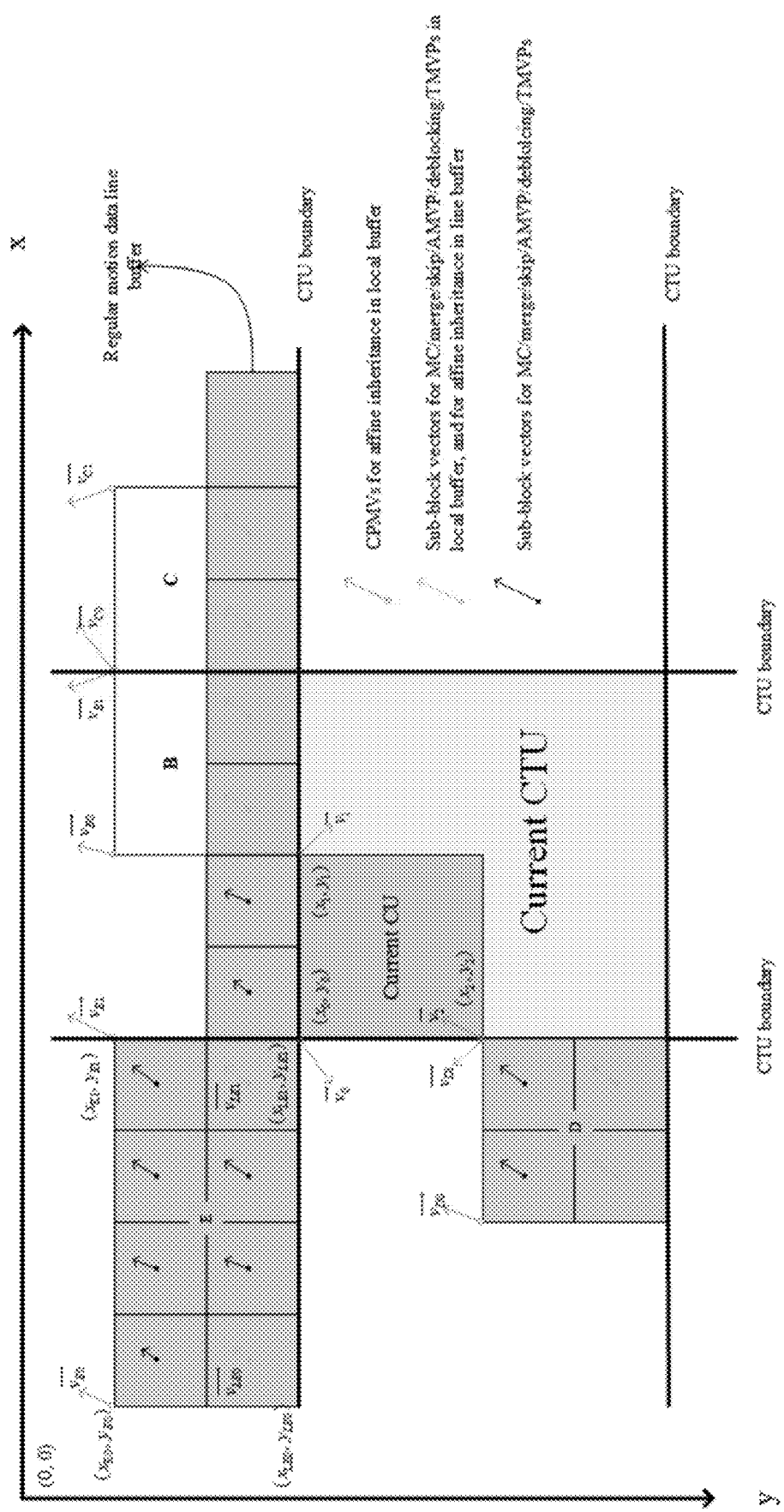
FIG. 14 is an example of motion vector usage in accordance with an embodiment.
Figure 15:
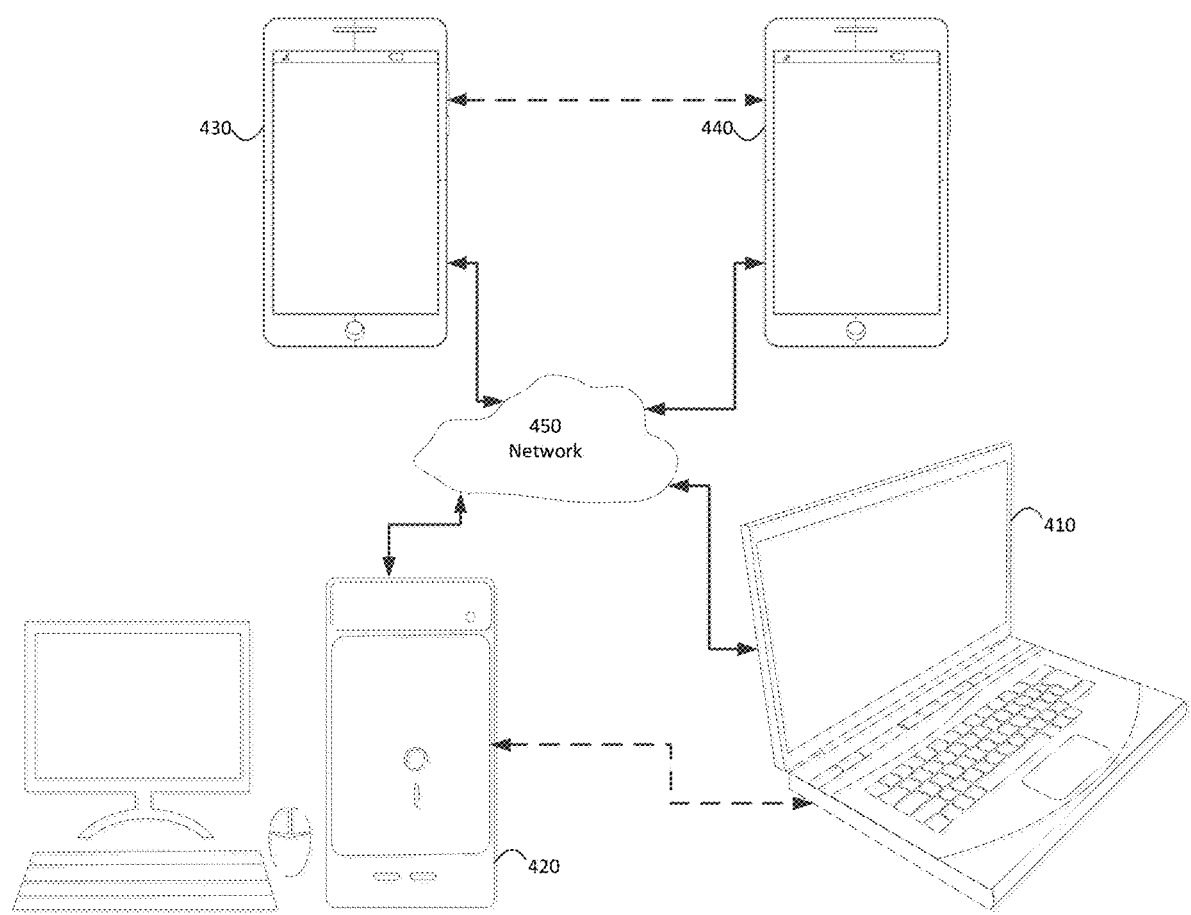
FIG. 15 is a simplified block diagram of a communication system in accordance with an embodiment.

FIG. 15 illustrates a simplified block diagram of a communication system (400) according to an embodiment of the present disclosure. The communication system (400) may include at least two terminals (410-420) interconnected via a network (450). For unidirectional transmission of data, a first terminal (410) may code video data at a local location for transmission to the other terminal (420) via the network (450). The second terminal (420) may receive the coded video data of the other terminal from the network (450), decode the coded data and display the recovered video data. Unidirectional data transmission may be common in media serving applications and the like.

FIG. 15 illustrates a second pair of terminals (430, 440) provided to support bidirectional transmission of coded video that may occur, for example, during videoconferencing. For bidirectional transmission of data, each terminal (430, 440) may code video data captured at a local location for transmission to the other terminal via the network (450). Each terminal (430, 440) also may receive the coded video data transmitted by the other terminal, may decode the coded data and may display the recovered video data at a local display device.

In FIG. 15, the terminals (410-440) may be illustrated as servers, personal computers and smart phones but the principles of the present disclosure are not so limited. Embodiments of the present disclosure find application with laptop computers, tablet computers, media players and/or dedicated video conferencing equipment. The network (450) represents any number of networks that convey coded video data among the terminals (410-440), including for example wireline and/or wireless communication networks. The communication network (450) may exchange data in circuit-switched and/or packet-switched channels. Representative networks include telecommunications networks, local area networks, wide area networks and/or the Internet. For the purposes of the present discussion, the architecture and topology of the network (450) may be immaterial to the operation of the present disclosure unless explained herein below.

Figure 16:
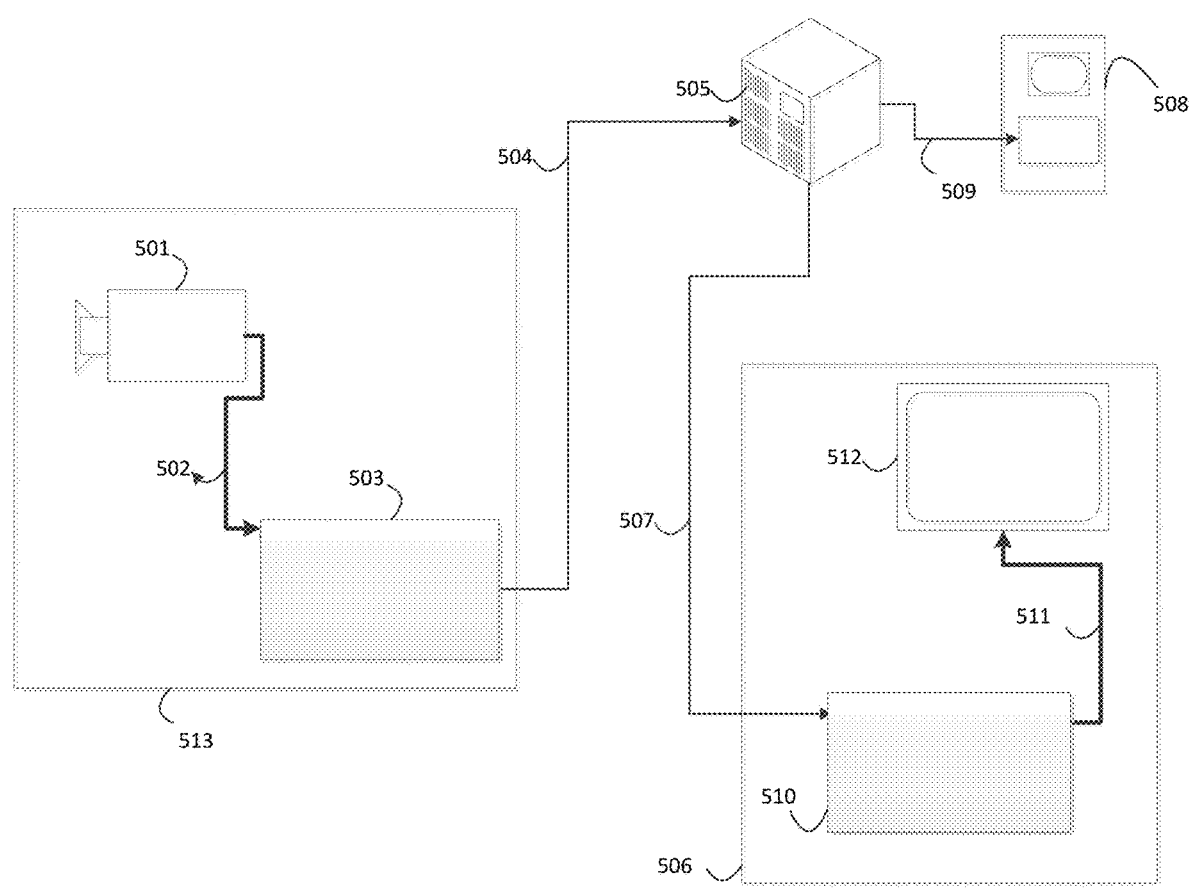
FIG. 16 is a diagram of a streaming environment in accordance with an embodiment.

FIG. 16 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (513), that can include a video source (501), for example a digital camera, creating, for example, an uncompressed video sample stream (502). That sample stream (502), depicted as a bold line to emphasize a high data volume when compared to encoded video bitstreams, can be processed by an encoder (503) coupled to the camera (501). The encoder (503) can include hardware, software, or a combination thereof to enable or implement aspects of the disclosed subject matter as described in more detail below. The encoded video bitstream (504), depicted as a thin line to emphasize the lower data volume when compared to the sample stream, can be stored on a streaming server (505) for future use. One or more streaming clients (506, 508) can access the streaming server (505) to retrieve copies (507, 509) of the encoded video bitstream (504). A client (506) can include a video decoder (510) which decodes the incoming copy of the encoded video bitstream (507) and creates an outgoing video sample stream (511) that can be rendered on a display (512) or other rendering device (not depicted). In some streaming systems, the video bitstreams (504, 507, 509) can be encoded according to certain video coding/ compression standards. Examples of those standards include H.265 HEVC. Under development is a video coding standard informally known as Versatile Video Coding (VVC). The disclosed subject matter may be used in the context of VVC.

Figure 17:
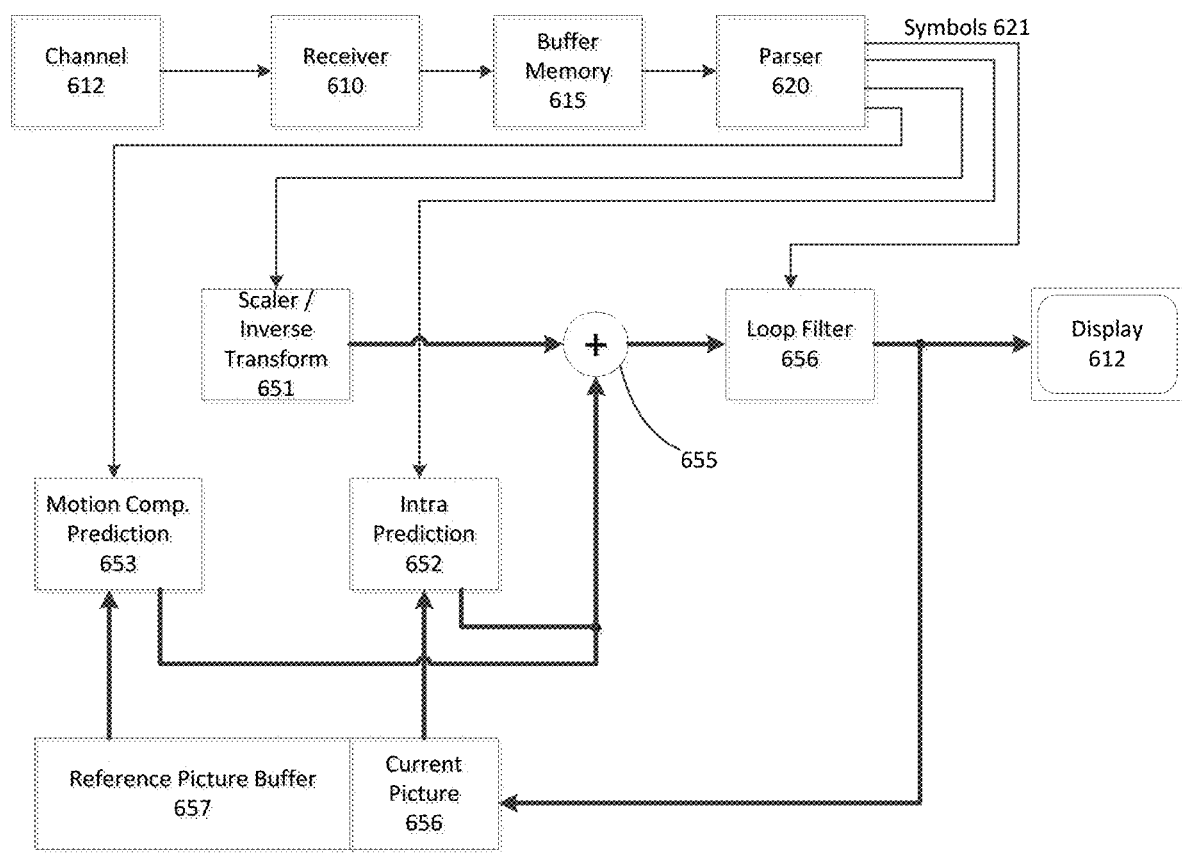
FIG. 17 is a block diagram of a video decoder in accordance with an embodiment.

FIG. 17 may be a functional block diagram of a video decoder (510) according to an embodiment of the present invention.

A receiver (610) may receive one or more codec video sequences to be decoded by the decoder (610); in the same or another embodiment, one coded video sequence at a time, where the decoding of each coded video sequence is independent from other coded video sequences. The coded video sequence may be received from a channel (612), which may be a hardware/software link to a storage device which stores the encoded video data. The receiver (610) may receive the encoded video data with other data, for example, coded audio data and/or ancillary data streams, that may be forwarded to their respective using entities (not depicted). The receiver (610) may separate the coded video sequence from the other data. To combat network jitter, a buffer memory (615) may be coupled in between receiver (610) and entropy decoder/parser (620) ("parser" henceforth). When receiver (610) is receiving data from a store/forward device of sufficient bandwidth and controllability, or from an isosychronous network, the buffer (615) may not be needed, or can be small. For use on best effort packet networks such as the Internet, the buffer (615) may be required, can be comparatively large and can advantageously of adaptive size.

The video decoder (510) may include a parser (620) to reconstruct symbols (621) from the entropy coded video sequence. Categories of those symbols include information used to manage operation of the decoder (510), and potentially information to control a rendering device such as a display (512) that is not an integral part of the decoder but can be coupled to it, as was shown in FIG. 17. The control information for the rendering device(s) may be in the form of Supplementary Enhancement Information (SEI messages) or Video Usability Information (VUI) parameter set fragments (not depicted). The parser (620) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (620) may perform entropy decoding/parsing operation on the video sequence received from the buffer (615), so to create symbols (621). The parser (620) may receive encoded data, and selectively decode particular symbols (621). Further, the parser (620) may determine whether the particular symbols (621) are to be provided to a Motion Compensation Prediction unit (653), a scaler/inverse transform unit (651), an Intra Prediction Unit (652), or a loop filter (656).

Reconstruction of the symbols (621) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (620). The flow of such subgroup control information between the parser (620) and the multiple units below is not depicted for clarity.

Beyond the functional blocks already mentioned, decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (651). The scaler/inverse transform unit (651) receives quantized transform coefficient as well as control information, including which transform to use, block size, quantization factor, quantization scaling matrices, etc. as symbol(s) (621) from the parser (620). It can output blocks comprising sample values, that can be input into aggregator (655).

In some cases, the output samples of the scaler/inverse transform (651) can pertain to an intra coded block; that is: a block that is not using predictive information from previously reconstructed pictures, but can use predictive information from previously reconstructed parts of the current picture. Such predictive information can be provided by an intra picture prediction unit (652). In some cases, the intra picture prediction unit (652) generates a block of the same size and shape of the block under reconstruction, using surrounding already reconstructed information fetched from the current (partly reconstructed) picture (656). The aggregator (655), in some cases, adds, on a per sample basis, the prediction information the intra prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a Motion Compensation Prediction unit (653) can access reference picture memory (657) to fetch samples used for prediction. After motion compensating the fetched samples in accordance with the symbols (621) pertaining to the block, these samples can be added by the aggregator (655) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (621) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (655) can be subject to various loop filtering techniques in the loop filter unit (656). Video compression technologies can include in-loop filter technologies that are controlled by parameters included in the coded video bitstream and made available to the loop filter unit (656) as symbols (621) from the parser (620), but can also be responsive to meta-information obtained during the decoding of previous (in decoding order) parts of the coded picture or coded video sequence, as well as responsive to previously reconstructed and loop-filtered sample values.

The output of the loop filter unit (656) can be a sample stream that can be output to the render device (512) as well as stored in the reference picture memory (656) for use in future inter-picture prediction.

Certain coded pictures, once fully reconstructed, can be used as reference pictures for future prediction. Once a coded picture is fully reconstructed and the coded picture has been identified as a reference picture (by, for example, parser (620)), the current reference picture (656) can become part of the reference picture buffer (657), and a fresh current picture memory can be reallocated before commencing the reconstruction of the following coded picture.

The video decoder (510) may perform decoding operations according to a predetermined video compression technology that may be documented in a standard, such as H.265 HEVC. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (610) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 18:
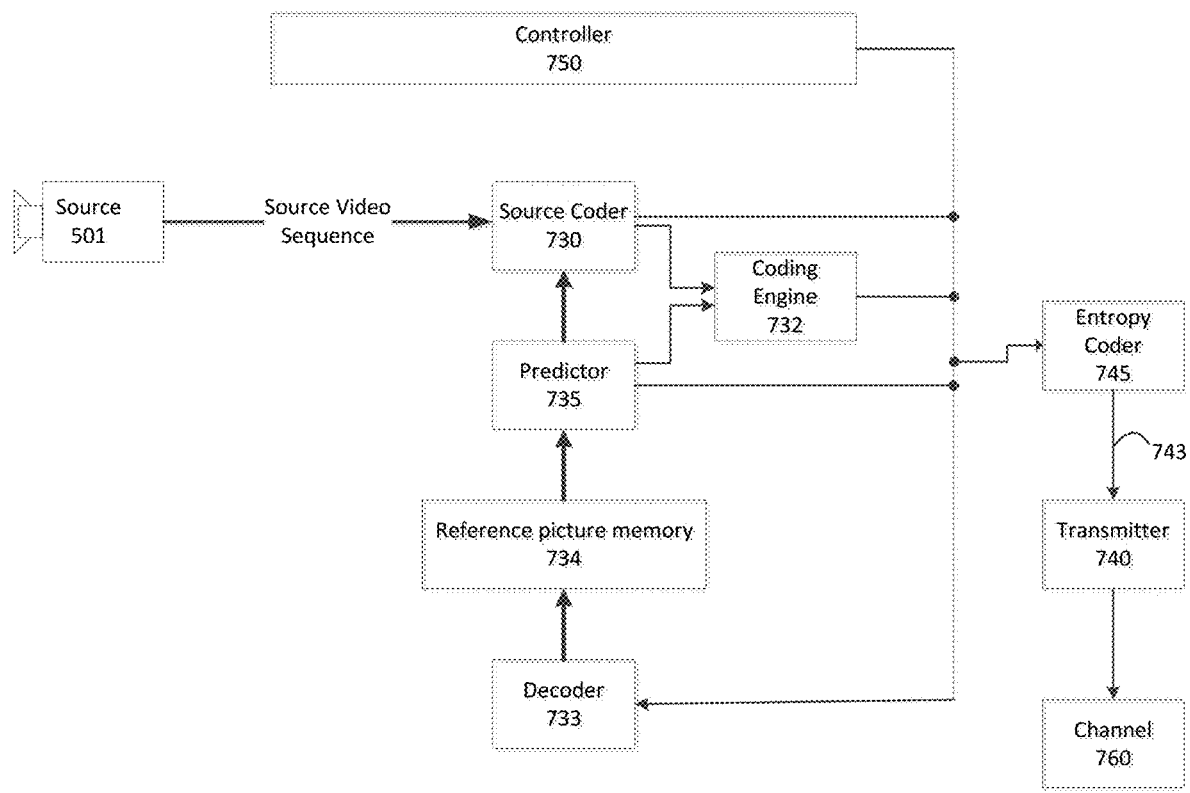
FIG. 18 is a block diagram of a video encoder in accordance with an embodiment.

FIG. 18 may be a functional block diagram of a video encoder (503) according to an embodiment of the present disclosure.

The encoder (503) may receive video samples from a video source (501) (that is not part of the encoder) that may capture video image(s) to be coded by the encoder (503).

The video source (501) may provide the source video sequence to be coded by the encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (503) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (503) may code and compress the pictures of the source video sequence into a coded video sequence (743) in real time or under any other time constraints as required by the application. Enforcing appropriate coding speed is one function of Controller (750). Controller (750) controls other functional units as described below and is functionally coupled to these units. The coupling is not depicted for clarity. Parameters set by controller can include rate control related parameters (picture skip, quantizer, lambda value of rate-distortion optimization techniques, etc.), picture size, group of pictures (GOP) layout, maximum motion vector search range, and so forth. A person skilled in the art can readily identify other functions of controller (750) as they may pertain to video encoder (503) optimized for a certain system design.

Some video encoders operate in what a person skilled in the art readily recognizes as a "coding loop." As an oversimplified description, a coding loop can consist of the encoding part of an encoder (730) ("source coder" henceforth) (responsible for creating symbols based on an input picture to be coded, and a reference picture(s)), and a (local) decoder (733) embedded in the encoder (503) that reconstructs the symbols to create the sample data that a (remote) decoder also would create (as any compression between symbols and coded video bit stream is lossless in the video compression technologies considered in the disclosed subject matter). That reconstructed sample stream is input to the reference picture memory (734). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (733) can be the same as of a "remote" decoder (510), which has already been described in detail above in conjunction with FIG. 16. Briefly referring also to FIG. 16, however, as symbols are available and en/decoding of symbols to a coded video sequence by entropy coder (745) and parser (620) can be lossless, the entropy decoding parts of decoder (510), including channel (612), receiver (610), buffer (615), and parser (620) may not be fully implemented in local decoder (733).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (730) may perform motion compensated predictive coding, which codes an input frame predictively with reference to one or more previously-coded frames from the video sequence that were designated as "reference frames." In this manner, the coding engine (732) codes differences between pixel blocks of an input frame and pixel blocks of reference frame(s) that may be selected as prediction reference(s) to the input frame.

The local video decoder (733) may decode coded video data of frames that may be designated as reference frames, based on symbols created by the source coder (730). Operations of the coding engine (732) may advantageously be lossy processes. When the coded video data may be decoded at a video decoder (not shown in FIG. 17), the reconstructed video sequence typically may be a replica of the source video sequence with some errors. The local video decoder (733) replicates decoding processes that may be performed by the video decoder on reference frames and may cause reconstructed reference frames to be stored in the reference picture cache (734). In this manner, the encoder (503) may store copies of reconstructed reference frames locally that have common content as the reconstructed reference frames that will be obtained by a far-end video decoder (absent transmission errors).

The predictor (735) may perform prediction searches for the coding engine (732). That is, for a new frame to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the video coder (730), including, for example, setting of parameters and subgroup parameters used for encoding the video data.

Output of all aforementioned functional units may be subjected to entropy coding in the entropy coder (745). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (740) may buffer the coded video sequence(s) as created by the entropy coder (745) to prepare it for transmission via a communication channel (760), which may be a hardware/software link to a storage device which would store the encoded video data. The transmitter (740) may merge coded video data from the video coder (730) with other data to be transmitted, for example, coded audio data and/or ancillary data streams (sources not shown).

The controller (750) may manage operation of the encoder (503). During coding, the controller (750) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (503) may perform coding operations according to a predetermined video coding technology or standard, such as H.265 HEVC. In its operation, the video coder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (740) may transmit additional data with the encoded video. The video coder (730) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The present disclosure is directed to several block partitioning methods wherein motion information is considered during a tree split for video encoding. More specifically, the techniques in this disclosure relate to tree splitting methods for flexible tree structures based on motion field information. The techniques proposed in this disclosure can be applied to both homogenous and heterogeneous derived motion fields.

Derived motion field of a block is defined as homogenous if the derived motion field is available for all sub-blocks in the block and all motion vectors in the derived motion field are similar, such as, the motion vectors share the same reference frame and the absolute differences among motion vectors are all below a certain threshold. The threshold may be signaled in bitstreams or predefined.

Derived motion field of a block is defined as heterogeneous if the derived motion field is available for all sub-blocks in the block and the motion vectors in the derived motion field are not similar, such as, at least one motion vector refers to a reference frame which is not referred by other motion vectors, or at least one absolute difference between two motion vectors in the field is larger than a signaled or predefined threshold.

Figure 19:
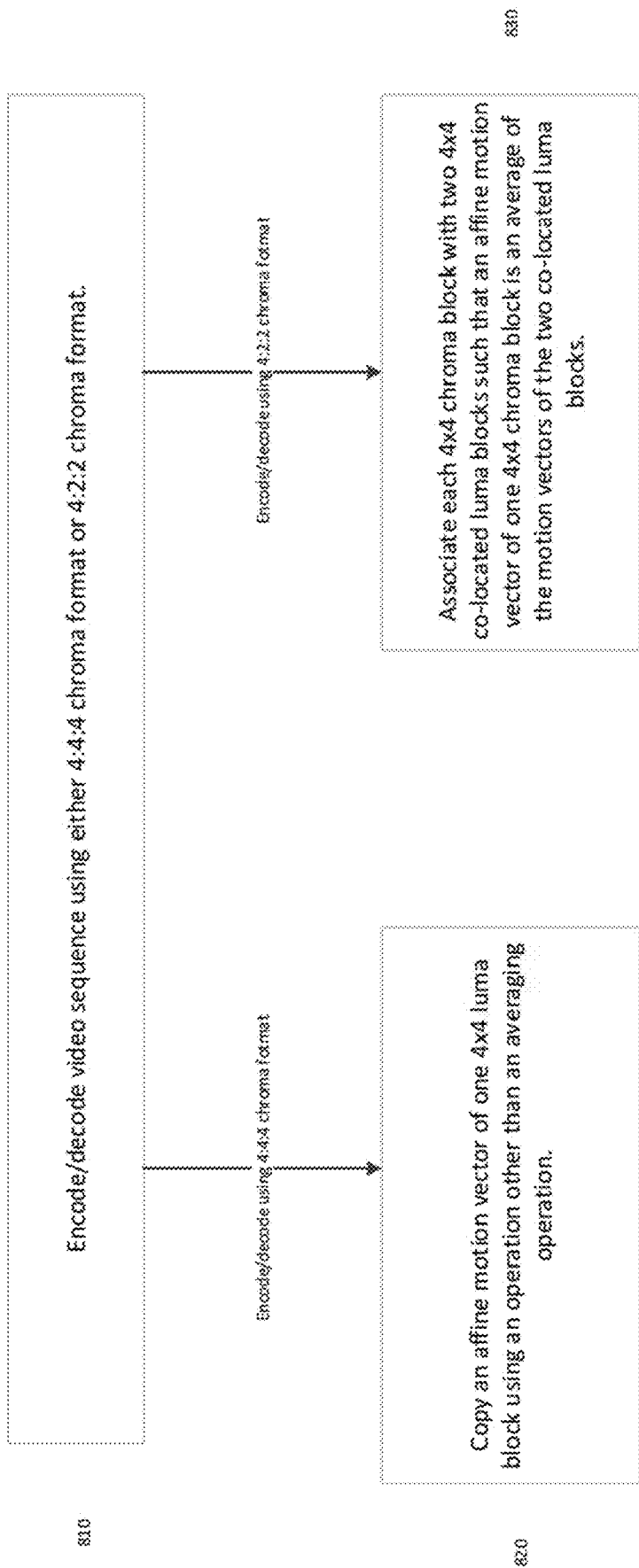
FIG. 19 is a flowchart of an example process for encoding or decoding a video sequence in accordance with an embodiment.

FIG. 19 is a flowchart of an example process (800) for encoding or decoding a video sequence. In some implementations, one or more process blocks of FIG. 19 may be performed by decoder (510). In some implementations, one or more process blocks of FIG. 19 may be performed by another device or a group of devices separate from or including decoder (510), such as encoder (503).

As shown in FIG. 19, process (800) may comprise encoding or decoding a video sequence using a 4:4:4 chroma format or a 4:2:2 chroma format (810).

When process (800) includes encoding or decoding the video sequence using the 4:4:4 chroma format, as further shown in FIG. 19, process (800) may further comprises copying an affine motion vector of one 4×4 chroma block using an operation other than an averaging operation (820).

When process (800) includes encoding or decoding the video sequence using the 4:2:2 chroma format, as further shown in FIG. 19, process (800) may further comprises associating each 4×4 chroma block with two 4×4 co-located chroma blocks such that an affine motion vector of one 4×4 chroma block is an average of the motion vectors of the two co-located chroma blocks (830).

Although FIG. 19 shows example blocks of process (800), in some implementations, process (800) may include additional blocks, fewer blocks, different blocks, or differently arranged blocks than those depicted in FIG. 19. Additionally, or alternatively, two or more of the blocks of process (800) may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 20 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
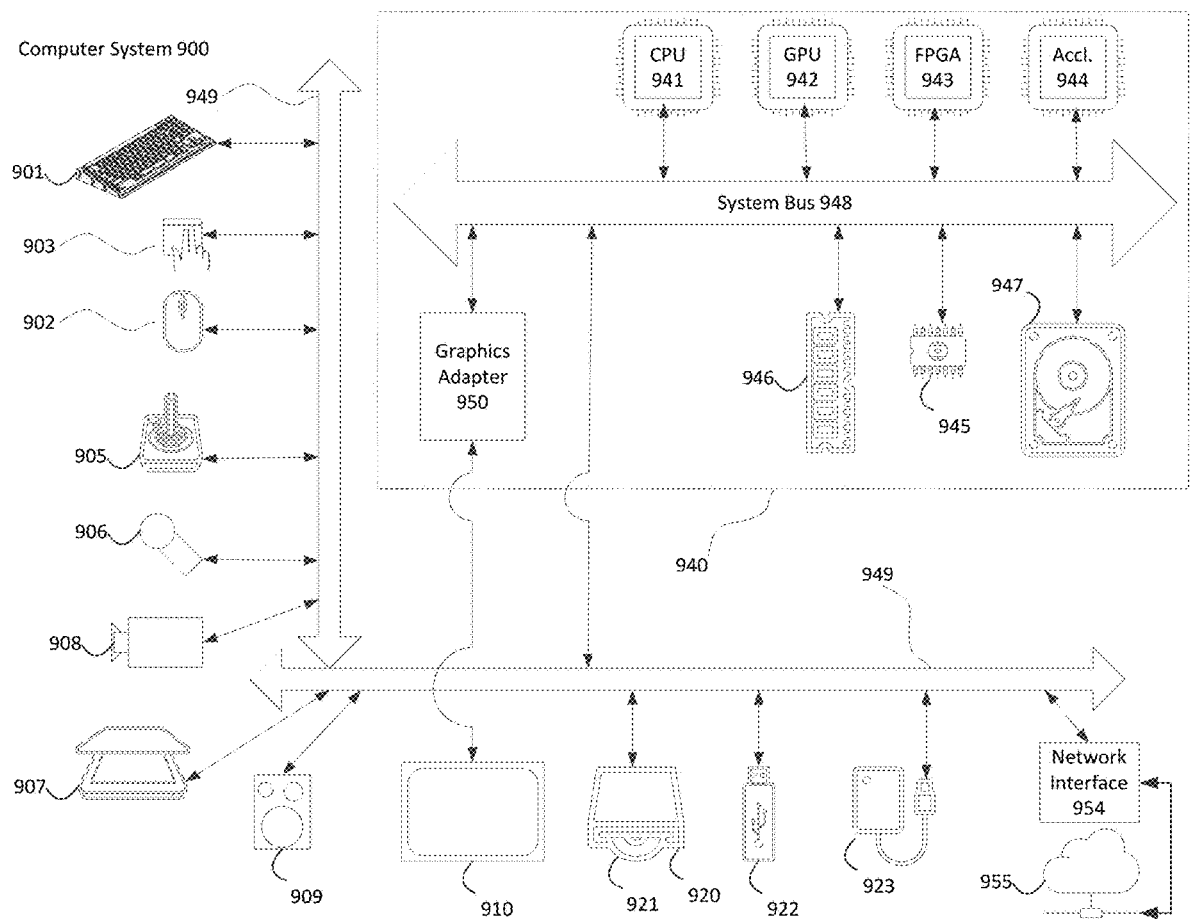
FIG. 20 is a diagram of a computer system in accordance with an embodiment.

The components shown in FIG. 20 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (904), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (904), or joystick (905), but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example universal serial bus (USB) ports of the computer system (900); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) 942, specialized programmable processing units in the form of Field Programmable Gate Areas (FPGA) (943), hardware accelerators for certain tasks (944), and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus 949. Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for encoding or decoding a video sequence, the method comprising:
   encoding or decoding the video sequence using one of a 4:4:4 chroma format and a 4:2:2 chroma format,
   wherein when encoding or decoding the video sequence using the 4:4:4 chroma format, the method further comprises copying an affine motion vector of one 4×4 luma block using an operation other than an averaging operation and associating the affine motion vector to a co-located 4×4 chroma block,
   wherein when encoding or decoding the video sequence using the 4:2:2 chroma format, the method further comprises associating each 4×4 chroma block with two 4×4 co-located luma blocks such that an affine motion vector of one 4×4 chroma block is an average of the motion vectors of the two co-located luma blocks,
   wherein a maximum allowed transform size is the same for different color components, and
   wherein when encoding or decoding the video sequence using the 4:2:2 chroma format, a maximum vertical transform size is the same among different color components, and a maximum horizontal transform size for color components is half of a maximum horizontal transform size for luma components.

2. The method of claim 1, further comprising,
   regardless of the chroma format, dividing a current 4×4 chroma block into four 2×2 sub-blocks,
   deriving a first affine motion vector of a co-located luma block for a top-left 2×2 chroma sub-block,
   deriving a second affine motion vector of the co-located luma block for a bottom-right 2×2 chroma block, and
   deriving an affine motion vector of the current 4×4 chroma block using the average of the first affine motion vector and the second affine motion vector.

3. The method of claim 1, further comprising
   aligning an interpolation filter used for motion compensation between luma and chroma components.

4. The method of claim 3, wherein when a video sequence is input using a 4:2:0 chroma format, applying an 8-tap interpolation filter for luma components and chroma components.

5. The method of claim 1, further comprising,
   coding as three separate trees, components Y, Cb, and Cr, and
   wherein each tree of the three separate trees codes one component of the components Y, Cb, and Cr.

6. The method of claim 5, wherein the coding as three separate trees is performed for an I slice or an I tile group.

7. The method of claim 1, wherein at least one of a Position-Dependent Predictor combination (PDPC), a Multiple Transform Selection (MTS), a Non-Separable Secondary Transform (NSST), an Intra-Sub Partitioning (ISP), and a Multiple reference line (MRL) intra prediction is applied to both a luma component and a chroma component.

8. The method of claim 7, wherein
when the Multiple reference line (MRL) intra prediction is applied to both the luma component and the chroma component, and when encoding or decoding the video sequence is performed using the 4:4:4 chroma format, the method further comprises selecting an Nth reference for intra prediction, and using a same reference line without explicit signaling for chroma components,
when the Intra-Sub Partitioning (ISP) is applied to both the luma component and the chroma component, the method further comprises applying the Intra-Sub Partitioning (ISP) at a block level for a current block for components Y, Cb, and Cr, and
when different trees are used for different color components, the method further comprises implicitly deriving coding parameters for U and V components from collocated Y components without signaling.

9. A device for encoding or decoding a video sequence, the device comprising;
at least one memory configured to store program code;
at least one processor configured to read the program code and operate as instructed by the program code, the program code including:
first encoding or decoding code configured to cause the at least one processor to encode or decode the video sequence using at least one of a 4:4:4 chroma format and a 4:2:2 chroma format,
wherein when the first encoding or decoding code is configured to cause the at least one processor to encode or decode the video sequence using the 4:4:4 chroma format, the first encoding or decoding code further comprises code configured to cause the at least one processor to copy an affine motion vector of one 4×4 luma block using an operation other than an averaging operation and to associate the affine motion vector to a co-located 4×4 chroma block,
wherein when the first encoding or decoding code is configured to cause the at least one processor to encode or decode the video sequence using the 4:2:2 chroma format, the first encoding or decoding code further comprises code configured to cause the at least one processor to associate each 4×4 chroma block with two 4×4 co-located luma blocks such that an affine motion vector of one 4×4 chroma block is an average of the motion vectors of the two co-located luma blocks,
wherein the first encoding or decoding code further comprises code configured to cause the at least one processor to allow a maximum transform size to be the same for different color components, and
wherein when the first encoding or decoding code is configured to cause the at least one processor to encode or decode the video sequence using the 4:2:2 chroma format, the first encoding or decoding code further comprises code configured to cause the at least one processor to set a maximum vertical size to be the same among different color components, and set a maximum horizontal transform size for color components to be half of a maximum horizontal transform size for luma components.

10. The device of claim 9, wherein the first encoding or decoding code further comprises code configured to cause the at least one processor to:
divide a current 4×4 chroma block into four 2×2 sub-blocks,
derive a first affine motion vector of a co-located luma block for a top-left 2×2 chroma sub-block,
derive a second affine motion vector of the co-located luma block for a bottom-right 2×2 chroma block, and
derive an affine motion vector of the current 4×4 chroma block using the average of the first affine motion vector and the second affine motion vector.

11. The device of claim 9, wherein the first encoding or decoding code further comprises code configured to cause the at least one processor to:
align an interpolation filter used for motion compensation between luma and chroma components.

12. The device of claim 11, wherein when the first encoding or decoding code is configured to cause the at least one processor to encode or decode the video sequence using the 4:2:2 chroma format, the first encoding or decoding code further comprises code configured to cause the at least one processor to
apply an 8-tap interpolation filter for luma components and chroma components.

13. The device of claim 9, wherein the first encoding or decoding code further comprises code configured to cause the at least one processor to:
code as three separate trees, components Y, Cb, and Cr, and
wherein each tree of the three separate trees codes one component of the components Y, Cb, and Cr.

14. The device of claim 13, wherein the configuration to code as three separate trees is configured to be performed for an I slice or an I tile group.

15. The device of claim 9, wherein the first encoding or decoding code further comprises code configured to cause the at least one processor to:
apply at least one of a Position-Dependent Predictor combination (PDPC), a Multiple Transform Selection (MTS), a Non-Separable Secondary Transform (NSST), an Intra-Sub Partitioning (ISP), and a Multiple reference line (MRL) intra prediction to both a luma component and a chroma component.

16. A non-transitory computer-readable medium storing program code, the program code comprising one or more instructions that, when executed by one or more processors of a device, cause the one or more processors to:
encode or decode the video sequence using at least one of a 4:4:4 chroma format and a 4:2:2 chroma format,
wherein when the instructions, when executed by the one or more processors of the device cause the one or more processors to encode or decode the video sequence using the 4:4:4 chroma format, the instructions, when executed by the one or more processors of the device, further cause the one or more processors to copy an affine motion vector of one 4×4 luma block using an operation other than an averaging operation and associating the affine motion vector to a co-located 4×4 chroma block,
wherein when the instructions, when executed by the one or more processors of the device cause the one or more processors to encode or decode the video sequence using the 4:2:2 chroma format, the instructions, when executed by the one or more processors of the device, further cause the one or more processors to associate each 4×4 chroma block with two 4×4 co-located luma blocks such that an affine motion vector of one 4×4 chroma block is an average of the motion vectors of the two co-located luma blocks,
wherein a maximum allowed transform size is the same for different color components, and
wherein when encoding or decoding the video sequence using the 4:2:2 chroma format, a maximum vertical transform size is the same among different color components, and a maximum horizontal transform size for color components is half of a maximum horizontal transform size for luma components.

* * * * *